United States Patent
Stoll

(10) Patent No.: US 9,336,692 B1
(45) Date of Patent: *May 10, 2016

(54) SURGICAL TRAINING EYE APPARATUS

(71) Applicant: Stuart Stoll, Thousand Oaks, CA (US)

(72) Inventor: Stuart Stoll, Thousand Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/501,014

(22) Filed: Sep. 29, 2014

Related U.S. Application Data

(63) Continuation-in-part of application No. 13/568,122, filed on Aug. 6, 2012, now Pat. No. 8,845,334.

(60) Provisional application No. 61/900,999, filed on Nov. 7, 2013, provisional application No. 61/987,482, filed on May 1, 2014.

(51) Int. Cl.
*G09B 23/30* (2006.01)

(52) U.S. Cl.
CPC ....................... *G09B 23/30* (2013.01)

(58) Field of Classification Search
CPC ....................................................... G09B 23/30
USPC ................... 434/262, 267, 270, 271
See application file for complete search history.

(56) References Cited

U.S. PATENT DOCUMENTS

| | | | |
|---|---|---|---|
| 971,026 A * | 9/1910 | Henry | 434/271 |
| 4,762,495 A | 8/1988 | Maloney | |
| 8,235,728 B2 | 8/2012 | Stoll et al. | |
| 8,845,334 B1 | 9/2014 | Stoll | |
| 2009/0291423 A1 * | 11/2009 | Hara | 434/271 |

OTHER PUBLICATIONS

U.S. Appl. No. 60/627,779, filed Nov. 13, 2004, First inventor: Stoll.
U.S. Appl. No. 11/273,378, filed Nov. 13, 2005, First inventor: Stoll.
U.S. Appl. No. 61/636,578, filed Apr. 20, 2012, First inventor: Stoll.
U.S. Appl. No. 13/568,122, filed Aug. 6, 2012, First inventor: Stoll.
U.S. Appl. No. 61/900,999, filed Nov. 7, 2013, First inventor: Stoll.
U.S. Appl. No. 61/796,115, filed Nov. 3, 2012, First inventor: Stoll.
U.S. Appl. No. 61/987,482, filed May 1 2014, First inventor: Stoll.

* cited by examiner

*Primary Examiner* — Bruk Gebremichael
(74) *Attorney, Agent, or Firm* — Law Office of David Hong

(57) ABSTRACT

An apparatus for teaching and practicing an ophthalmologic surgical technique of creating the continuous curvilinear capsulorhexis comprises a housing with a first base end and a second suction cup end for holding a malleable body; a flexible film or cellophane-type membrane covers the operating area of the malleable body; this flexible film can be held into place on the first base end with a first cap with an aperture or opening; in between the first base end and the second suction cup end, there can be a flexible stock with a threaded or friction connection. There can also be a second cap addition, which simulates a cornea and anterior chamber, which can be filled with viscoelastic material, which can increase the pressure in the eye and flattens the anterior capsule.

13 Claims, 7 Drawing Sheets

SURGICAL TRAINING EYE APPARATUS

This application is a continuation in part of U.S. patent application Ser. No. 13/568,122, filed on Aug. 6, 2012 and issues as U.S. Pat. No. 8,845,334 on Sep. 30, 2014; this application further claims the benefit of U.S. Provisional Patent Appl. No. 61/900,999, filed on Nov. 7, 2013 and U.S. Provisional Patent Appl. No. 61/987,482, filed on May 1, 2014.

This invention is related to U.S. patent application Ser. No. 13/568,122, filed on Aug. 6, 2012; U.S. patent application Ser. No. 11/273,378, filed on Nov. 13, 2005 and issued as U.S. Pat. No. 8,235,728 on Aug. 7, 2012; U.S. Provisional Patent Appl. No. 61/636,578, filed Apr. 20, 2012; and U.S. Provisional Patent Appl. No. 61/900,999, filed Nov. 7, 2013.

All of the above referenced applications and patents are incorporated by reference in their entirety.

BACKGROUND OF THE INVENTION

1. Field of the Invention

This invention relates to an improvement for a model and simulator for practicing ophthalmologic surgical techniques, including cataract surgery, and an apparatus for simulating the human eye structure, namely the human anterior lens capsule, to practice certain ophthalmologic surgery techniques.

2. Description of Related Art

Cataract surgery has evolved over the years as a result of contributions from many notable physicians as well as technological advances, which have led to the elegant procedure which is now commonly referred to as phacoemulsification or quite simply "phaco". Like a carefully choreographed dance within the eye, the many intricate steps to replace the crystalline lens must happen in a precise and orderly fashion. Each step in the process, while important in its own function, is vital for the success of the subsequent maneuvers and as such assumes a greater role towards the completion of an uncomplicated procedure. A complication during the early steps of surgery can lead the surgeon to stray off course, and a cascade of events may follow which could ultimately result in a sub-optimal result.

Microsurgery in the form of phacoemulsification has a very steep learning curve which requires hands-on training. It is not possible to learn and become proficient with the techniques from reading text, watching film or even observing in the operating room. A true appreciation for the complexity of the techniques and their potential complications can only be gained through actual surgical experience.

Cadaveric pig eyes are widely used in wet labs for teaching various steps of ocular surgery. However, there are difficulties associated with procurement and disposal of pig eyes, they are messy and contaminate the instruments, and they do not resemble the in-vivo human anatomy as closely as needed. This is especially true in regards to the anterior lens capsule where ophthalmology residents often attempt their first capsulotomies.

Model eyes have also been used but they all have significant limitations in terms of realism. Most model eyes do not incorporate ocular movement and if they do it requires a cumbersome and costly supporting apparatus. Most importantly, the realistic feel and tearing properties of the anterior capsule are inadequate in all currently available models. Further, in many cases, the dimensions of the anterior chamber are not to scale, which limits the utility of these designs.

More recently, electronic simulators have been developed which can provide excellent tips and guidance. However, these systems are extremely expensive and, more importantly, do not provide a realistic feel for manipulating instruments inside the eye.

Arguably one of the most difficult steps of phacoemulsification to master is the creation of the continuous curvilinear capsulorhexis or "CCC". Occurring prior to the use of the phacoemulsification probe within the eye, the successful creation of a CCC is vital to the safety of the procedure and the long-term stability of the lens implant within the eye.

In this continuous curvilinear capsulorhexis surgical technique, the surgeon creates a small incision with a cystotome (a bent needle type surgical tool) in the center of the anterior lens capsule to form a flap. Grasping this flap of tissue, the surgeon makes a tear in a circular or curvilinear fashion.

However, this is a difficult procedure to master, and if the surgeon does not reposition and re-grasp the flap of tissue appropriately and continue to tear in the desired circular fashion, there is the risk of creating an unwanted radial or downhill tear.

In addition, during surgery, there is the possibility of wound distortion and loss of viscoelastic material, which would in turn cause the surgical area to change from a relatively flat surface to a rounded configuration. This rounded configuration can further increase the possibility of developing an unwanted radial tear of the anterior lens capsule during this procedure.

The new "Simulorhexis™" teaching tool is now available to help ophthalmology residents understand and practice the technique of creating a circular caspulorhexis. Because the Simulorhexis device hones in on this one crucial step of phaco surgery, it provides the most realistic way to master the CCC technique prior to live surgery.

This invention presents a new and improved teaching tool to help ophthalmology residents understand and practice the technique of creating a continuous curvilinear capsulorhexis. This invaluable surgical teaching and practicing tool is easily accessible, portable, lightweight, and accurately mimics the physical feel and touch of human eye anatomy.

From the preceding descriptions, it is apparent that the devices currently being used have significant disadvantages. Thus, important aspects of the technology used in the field of invention remain amenable to useful refinement.

SUMMARY OF THE INVENTION

There is an improvement to the apparatus for teaching and practicing an ophthalmologic surgical technique of creating the continuous curvilinear capsulorhexis ("CCC") and comprises a housing with a first base end and a second (suction cup) end for holding a gel or putty-like malleable body to mimic the human lens; said malleable body is covered by a flexible and removable film or cellophane-type membrane (which mimics the anterior lens capsule); this flexible film can be held into place on the first base end with a cap with an aperture or opening.

Between the first base end and the second suction cup end, there can be a stock or body; this stock or body can also have a piston or strut mechanism or a threaded screw or pressure adjusting mechanism (connected to a pressure disk within the first base end); and on the first base end, there can be a top cap or outer guide.

Other embodiments allow for a pressure adding device that will provide upward pressure on the first base end so that the putty-like malleable body can be pushed upward to mimic the physical shape of a human anterior lens capsule.

The purpose of the invention is to provide a simple but elegant device to mimic, to simulate and to copy a portion of the human eye for training ophthalmologic surgeons with the proper feel and touch of the crystalline lens surface for the difficult continuous curvilinear capsulorhexis ("CCC") step in phacoemulsification.

Other purposes are to provide a practice training surface for surgeons; to replace practicing on cadaver pig eyes in a laboratory setting; to provide a simple, portable, and lightweight device that any surgical resident or practitioner could employ outside of the laboratory setting; and to provide an inexpensive and simple device on which to practice difficult eye surgical techniques.

The present invention introduces such refinements. In its preferred embodiments, the present invention has several aspects or facets that can be used independently, although they are preferably employed together to optimize their benefits. All of the foregoing operational principles and advantages of the present invention will be more fully appreciated upon consideration of the following detailed description, with reference to the appended drawings.

BRIEF DESCRIPTION OF THE DRAWINGS

FIG. 7a shows a viscoelastic gel to be placed on top of one of the openings of the "revolver" template.

PARTS LIST

Figure 1:
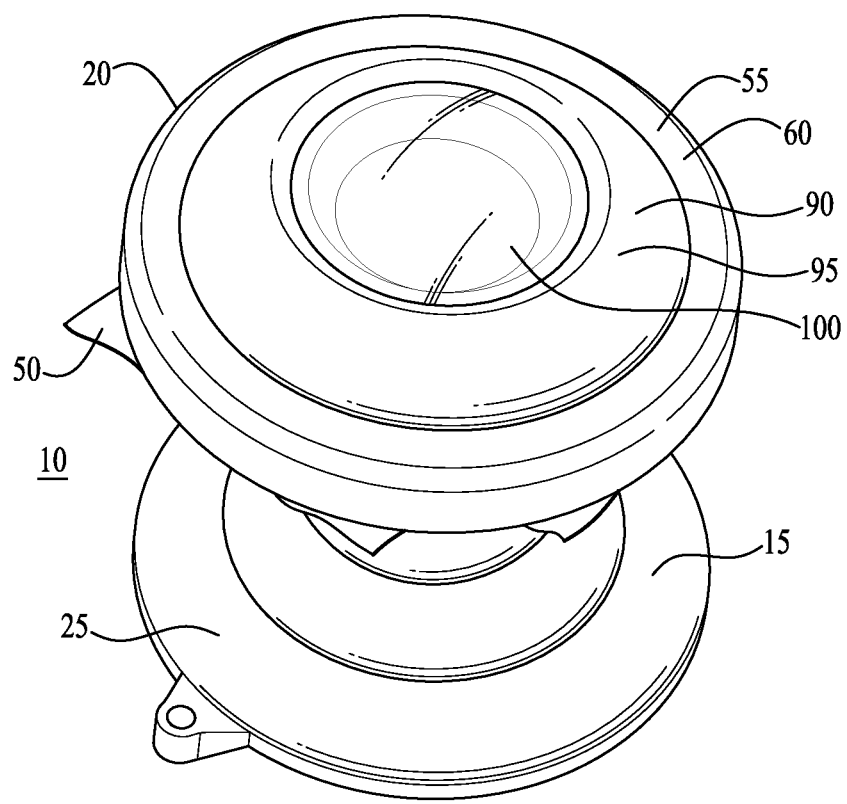
FIG. 1 shows one embodiment of improved apparatus, namely a housing with a first base end and a second suction cup end; between the first base end and the second suction cup end, there can be a stock or body; this stock or body can also have a piston or strut mechanism (not shown); and on the first base end, there can be a first cap (for holding the polyester film in place) and a second cap.
Figure 2:
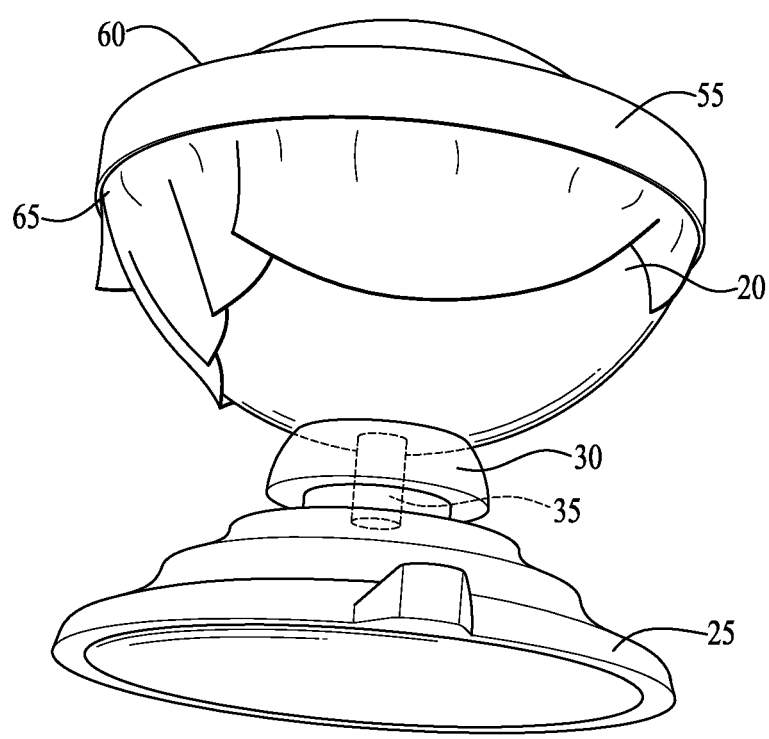
FIG. 2 shows of the apparatus of FIG. 1 with the second cap removed and showing the first cap over the polyester film and malleable body and the housing.
Figure 3:
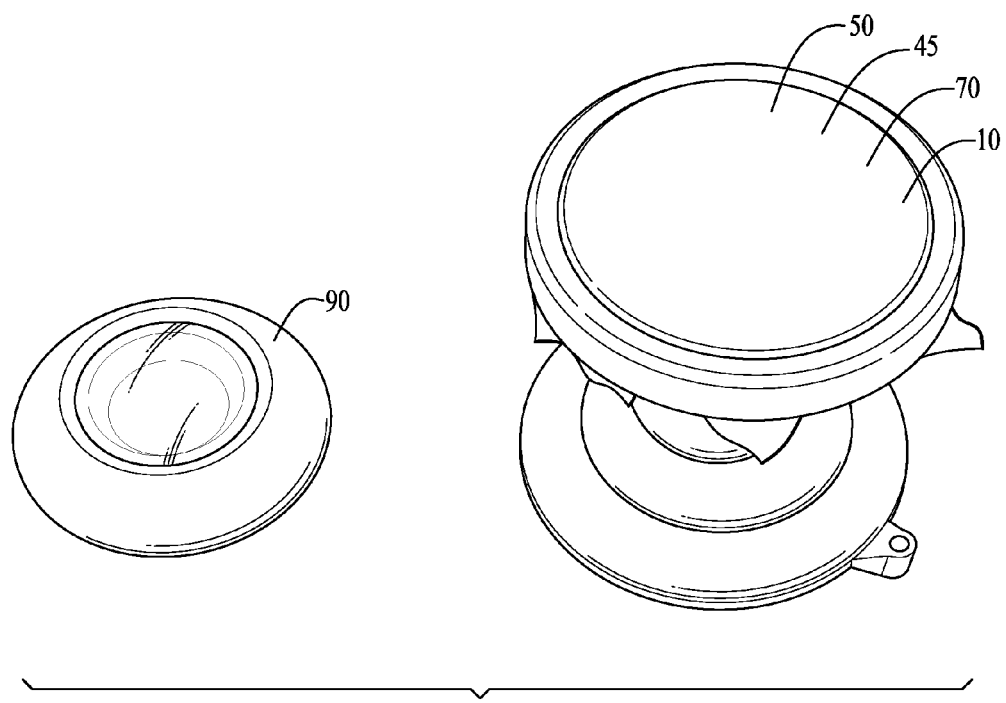
FIG. 3 shows a perspective view of the apparatus of FIG. 1 with the second cap removed to the side.
Figure 4:
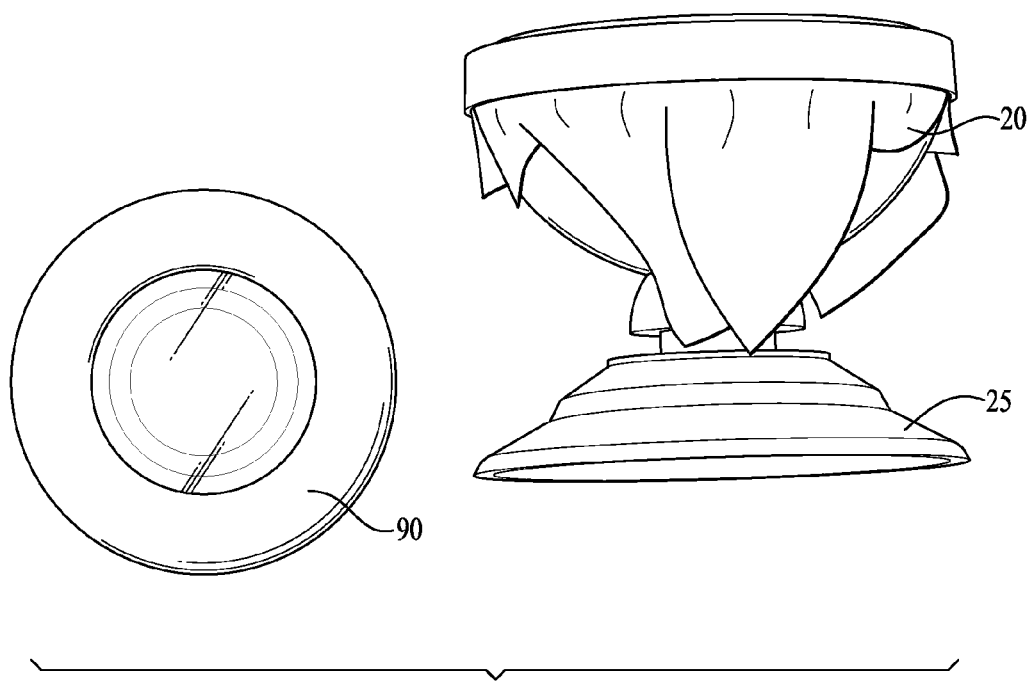
FIG. 4 shows a side view of the apparatus of FIG. 1.
Figure 5:
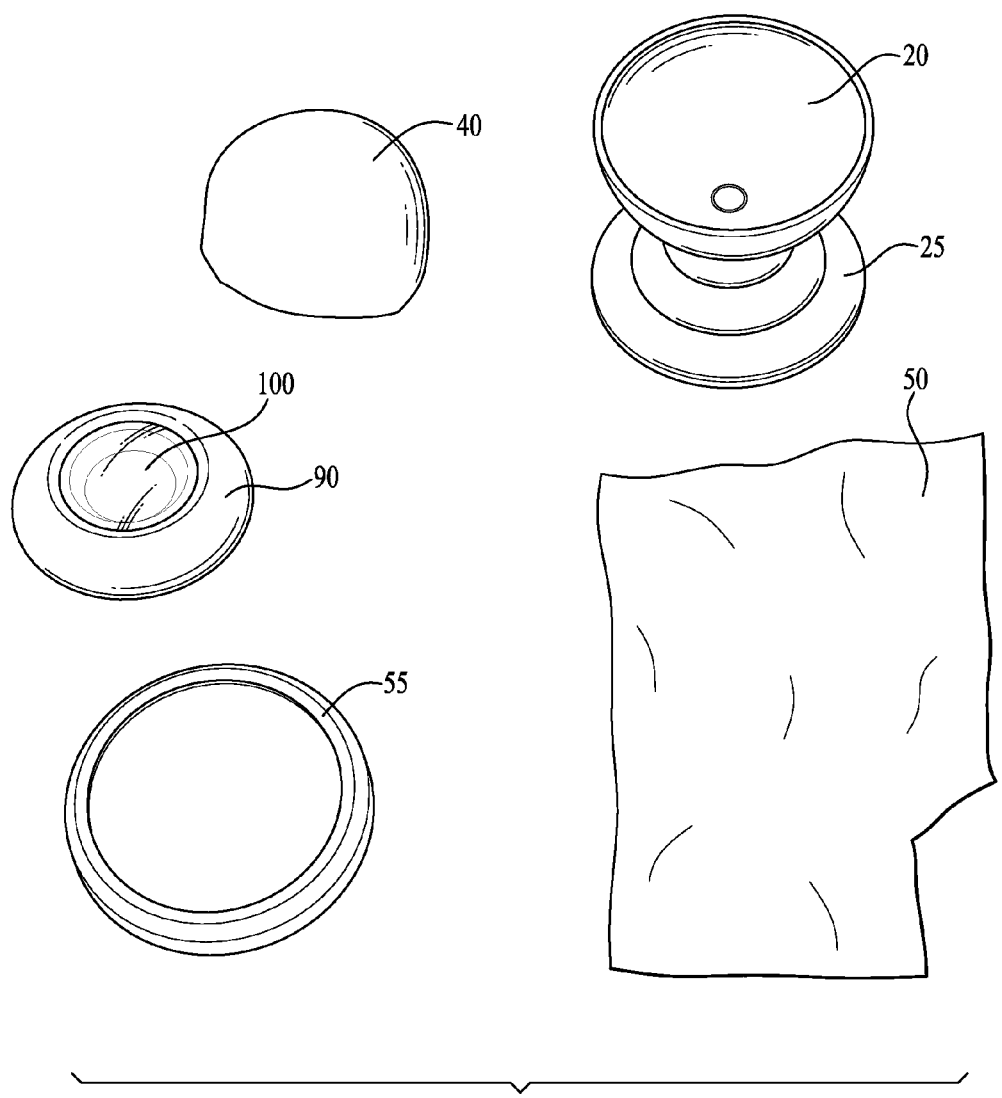
FIG. 5 shows the parts of the apparatus of FIG. 1.

10 Apparatus for Practicing Eye Surgery.
15 Housing
20 1st Base end
25 2nd Base end—suction cup end
30 stock
35 screw for stock
40 Malleable body, gel clay, putty, polymer (simulates human lens).
45 top or surgical surface of the malleable body
50 polyester film
55 first cap
60 outer surface of first cap
65 inner surface of the first cap
70 opening in the first cap
75 flange on first cap
80 threads on first cap
85 threads on first base end
90 second cap
95 outer portion of second cap
100 inner portion of second cap
110 mounting surface for suction cup end
120 pressure disk, which is connected to the screw for the stock
125 "revolver" template (first template); this embodiment has six openings.
130 opening on "revolver" template
135 central pupil template (second template)
140 opening on central pupil template
145 viscoelastic gel

DESCRIPTION OF THE PREFERRED EMBODIMENTS

As shown in FIG. 1-7, there is an improvement to the apparatus for teaching and practicing an ophthalmologic surgical technique of creating the continuous curvilinear capsulorhexis ("CCC") and comprises a housing with a first base end and a second end (suction cup) for holding a gel or putty-like malleable body to mimic the human lens anatomy; said malleable body is covered by a flexible and removable polyester film or cellophane-type film (which mimics the anterior lens capsule); between the first base end and the second suction cup end, there can be a stock or body; this stock or body can also have a piston or strut mechanism or another mechanism to increase the pressure within the housing to push the malleable body upwards; and on the first base end, there can be a first cap and a second cap.

Housing

As shown in FIG. 1-6, there is a housing with a first housing (or base) end and a second housing (or base) end (suction cup end).

First Housing End: First Base End

The first base end can be the shape of a half circle or any shaped container to mimic the human eye ball anatomy. In FIG. 1-6, the shape of the first base end is circular and round. This first base end will hold the putty, clay or polymer material and provide the relatively flat surgical surface.

Figure 6:
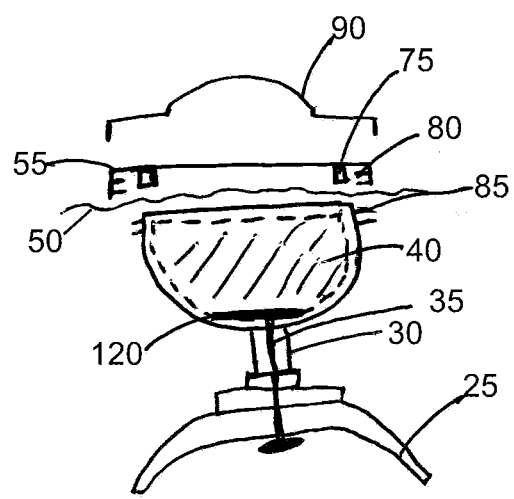
FIG. 6 shows another embodiment of the invention, which includes a pressure disk, which is mounted within the first base end and controlled and connected to the screw or threaded connector through the stock; there are also threaded engagement areas on the first cap and the first base end and a flange on the inner surface of the first cap.
Figure 7B:
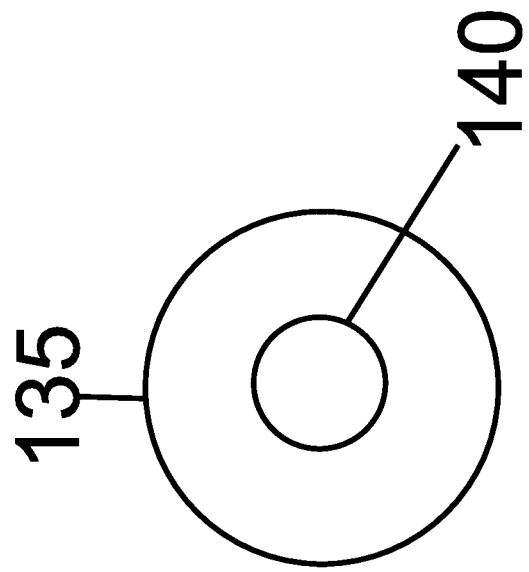
FIG. 7b a central opening template (which has at least one central opening) to be placed on top of the film surface.
Figure 7A:
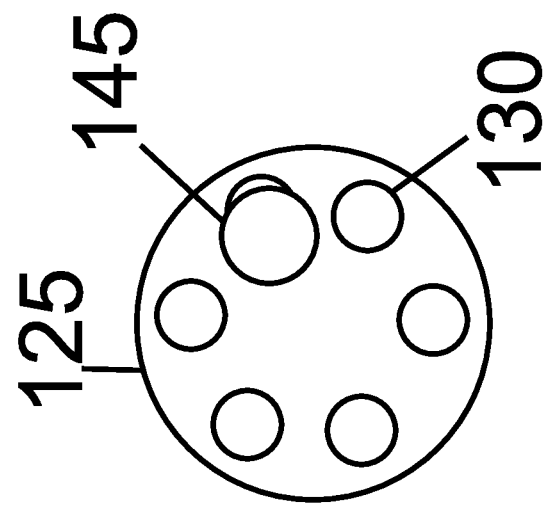
FIG. 7a shows a "revolver" template with at least one and up to six openings to be placed on top of the film surface.

The first housing end can also have threads near the peripheral edge to engage reciprocating threaded connectors on the first cap or first cover (see FIG. 6).

Second Housing End: Suction Cup Base

The second end or suction cup end can have an attachment structure such as a suction cup structure that allows placement and fixation to work on any flat, smooth surface.

Other types of fixed, but removable attachment devices can be used, including without limitation: as hook/loop connections, double sided tape or adhesive, non-marking glue.

Flexible Stalk or Stock

As shown in FIG. 1-6, there is a flexible stalk, stock or body that lies between the first and second end of the housing; this stalk or body leads from the suction cup base up to the first base end to mimic the eye structure. This stalk or body allows flexibility or some "give" to simulate eye and ocular movements during surgery.

In another embodiment to the stalk, there can be a piston or strut mechanism that allows adjustable pressure to be applied to the membrane/paper and putty apparatus to give more rounded shape to the complex, which will simulate posterior pressure or loss of viscoelastic material. Other types of moveable mechanisms like a rotating ball and socket or articulating joint can be used. This type of piston or strut mechanism makes the creation of a CCC more realistic and more challenging and helps to mimic the human eye anatomy.

Typically, the stalk connects the first and second ends of the housing using a threaded connection like a screw. Other embodiments can have the screw also act as a pressure inducing device, wherein one end of the screw or threaded connection is attached to a plate or disk with a relatively large surface area within the first housing end to allow upward pressure to be placed on the malleable body or gel (see FIG. 6).

Flexible Polyester Film or Membrane

The flexible polyester film or membrane is wrapped tightly around the top portion of the malleable body or the surgical surface, which lies within the first end of the housing (base end); this can accurately mimic the physical feel and touch of the human eye anatomy, namely the anterior lens capsule over the lens.

This flexible film or membrane has at least one surface and may also have a first or outer surface and a second or inner surface. The flexible film or membrane should be able to mimic the "physical feel and touch" of tearing the human anterior lens capsule in the "CCC" procedure. The flexible film can also be referred to as a membrane, sheath, tissue, or working surface.

This film can be comprised of many polyester or cellophane-type materials, including but not limited to synthetic or natural materials, cellophane, polypropylene film, mylar, cellulose, paper, or other similar materials. The thickness of this film can vary and will depend on the particular material. This cellophane-like paper, material and cover should have tearing properties similar to the anterior capsule of the human lens.

To further enhance the simulation of human eye anatomy, the film can be of a different color than the body. For example, the film could be clear and the body can be yellow colored or other contrasting color combinations to highlight the differences to the user.

In the preferred embodiment, the film is a two micron thick polyester film, which has been dyed to a particular color (such as red).

This film should be flexible, and readily removable from the malleable body, which helps this film to be easily removed, repositioned, and engaged with the malleable body allowing for multiple practice sessions with one cover.

Malleable Body/Gel

The film is substantially wrapped around the top surface or exposed portion of the malleable body, which substantially mimics the physical feel and touch of the human lens and eye anatomy below the anterior capsule of the lens.

The film can be tightly or tautly wrapped around the body. This body can be comprised of a variety of different materials, including but not limited to gels, putty, clay, modeling polymer, the WindBreaker brand gel, Silly Putty® brand toy. The body should be comprised of material that is malleable and easy to work with the hands, but the body should also provide enough resistance to mimic the human eye anatomy so that the user or surgeon may have an adequate model to practice surgical techniques. In addition, this malleable body can also be non-water-sensitive.

The body has a body surface, which is exposed when the user cuts the film with a surgical implement or tool such as a cystotome and cystotome needle, capsulorhexis forceps or other fine-point grasping implement.

First Cap: Holds Film in a Particular Position

This first base end can also have a first cap or cover with an aperture or opening; this cover can sandwich or enclose the flexible film material over the malleable body within the house. The first cap has an outer surface and an inner surface. In the preferred embodiment, the first cap uses a friction connection to engage the polyester flexible film, the malleable body and the first end of the housing.

In another embodiment, there can be a threaded connection between the first cap and the engagement area of the housing; the inner surface can have threaded connections that engage reciprocal threaded connections on the first housing end. On the interior portion of the first cap, there is a flange or lip that enables the interior portion of the first cap to push into the body of the housing.

As a result, when the first cap is continued to be screwed on the first housing end (via the threads on the cap and the housing), the lip or flange of the cap applies downward pressure on one portion of the malleable gel or body so that the interior pressure is increased. This is to mimic a complication of the lens anatomy during surgery; there is the possibility of wound distortion and loss of viscoelastic material, which would in turn cause the surgical area to change from a relatively flat surface to a rounded configuration.

Note that with the first cap engaging the film to the malleable body within the first housing end, there is a relatively large surgical area upon which to practice. However, to further develop and hone surgical acumen, it is preferred to add the second cap or corneal cap to reduce the surgical field and to more mimic human lens anatomy.

Second Cap or Corneal Cap

On the top portion of the first end of the housing, there can be a removable second or top cap or cover with a clear or opaque center, which reduces the scale to the actual size of the eye for further refinement of the eye surgery techniques. This second cap is a corneal cap through which a surgeon can make an incision and fill the space with viscoelastic material to create a more realistic simulation.

This second or top cap structure allows use of actual surgical instruments through corneal incision type of openings; allows for the upward expansion and rounding of the film-malleable body complex when posterior pressure is applied by the piston mechanism; and helps to contain viscoelastic material.

Some Design Advantages of this Improved Invention Include:
1. Suction cup base—small footprint, use on any flat surface, does not require other apparatus.
2. Flexible stalk—simulates eye movements; connects the housing to the suction cup base; this stalk can be flexible and allow movement not only around the central axis but axial movement as well in three directions (x, y and z axis). Other embodiments allow a screw to connect the suction cup base to the housing, and this screw would place additional upward pressure on the housing to increase pressure within the housing and subsequently push the malleable gel or body upwards.
3. Large surface area—practice multiple CCC tears on each model prior to disposal; no incisions to oar-lock the instruments when first learning; can make the tears very large to see how the "capsule" tears in response to different maneuvers; easy to place viscoelastic gel on top for increased realism of tearing the capsule.
4. High contrast—allows easy visualization because of the red film or paper over yellow putty (malleable body); can practice even without a microscope.
5. Adjustable Pressure—can simulate posterior pressure or loss of viscoelastic from anterior chamber as may occur from wound distortion which will allow the capsule to tear downhill and outward as can occur during surgery; can then practice the Little rescue technique.
6. Malleable body/gel/putty—simulates the lens material behind the anterior capsule; allows for adjusting the tension to round up the anterior capsule with increased pressure (posterior pressure or loss of visco from the eye) or flatten it with decreased pressure (placing more viscoelastic gel in the eye); able to adjust pressure to appropriate level when installing the cornea cap.

7. Flexible Film or Paper—provides the most realistic feel and tearing properties to simulate the anterior capsule of the human lens; material type and thickness is preferably a polyester film, approximately two (2) micrometers or microns; this is for example and not intended to be limiting. The two micron polyester is most similar to human anterior capsule tissue.

In other embodiments, the polyester film can be dyed to color the film to allow contrast between the body and the film, if both items are different colors.

8. Cornea cap (second cap)—in another embodiment, a removable and re-usable corneal cap structure can be added on top of the apparatus, which reduces dimensions to realistic size; incorporates a simulated iris to perform a single CCC within; allows creation of incisions to fill the anterior segment with viscoelastic over the anterior capsule; simulates the pressurized anterior chamber and allows placement of more visco in the eye to increase pressure and flatten the capsule; creates increased difficulty when creating CCC as incisions will oarlock the instrumentation as in real surgery Some Competitive Advantages of this Improved Surgical Technique Apparatus:

A dedicated simulator of the CCC technique; he most realistic simulator of the CCC technique; small foot print which simulates eye movements without additional apparatus; a stepwise approach to learning the CCC technique; oversized for initial practice and understanding of how the capsule tears; unencumbered for initial practice when learning how and where to grasp the capsule; realistic dimensions and feel when using the cornea cap; allows for practice even without a microscope; a special paper gives a very realistic simulation of the properties of the anterior capsule; a special putty simulates the lens material; adjustable pressure to round or flatten the anterior capsule as may occur during surgery; relative low cost.

Using the Invention:

Typically, the production model will already place the malleable body within the housing, but conceivably, the user can place the body of putty or clay into the first end of the housing and flatten the exposed surface; place the polyester film substantially and tightly around the top portion of the body and hold the film over the exposed portion of the body with a first cap or cover with an opening.

Once this flat or relatively flat working surface is created, the user can practice surgical techniques, including but not limited to the continuous curvilinear capsulorhexis ("CCC") procedure.

In addition, this instant invention also mimics one of the powerful features of the continuous curvilinear capsulorhexis technique, namely, maintaining the integrity of the lens capsule and preventing unwanted radial tears or ruptures of the lens capsule, even when great stress is placed on the surgical area during the "phaco" procedure. During a "phaco" procedure, a surgeon's actions of manipulating the lens within the capsular bag, rotating and spinning the lens, and disintegrating a cataract can place great stress upon the lens capsule.

Similarly, this invention allows for a realistic simulation of the forces upon the lens capsule during "phaco" and also the strength of this "CCC" surgical technique.

The cover can easily be removed and reapplied to the malleable body or gel in a new area to practice the techniques again. These materials may be reused many times without additional expense. The cover will eventually have to be replaced after enough tears have been created such that intact paper cannot be placed completely over the surface of the putty.

In order to master the "CCC" technique, the user must practice, practice, and practice this technique, and this instant invention allows for the user to practice this difficult surgical technique in basically any environment or situation and with very little cost or expense.

Alternative Embodiments

As stated above, one preferred application of this invention is to provide a suitable apparatus to practice techniques for cataract surgery, namely the continuous curvilinear capsulorhexis. In addition, users could practice other surgical techniques with this invention.

Additionally, this invention could also be integrated with other known eye surgery modeling devices to create new and improved modeling devices. For example, if a current modeling device allows for corneal incisions, then the current invention could be integrated so that after the corneal incision is completed, then the user can practice continuous curvilinear capsulorhexis and other cataract surgical methods.

SimulEye™

When it comes to other aspects of ocular surgery, SimulEye is the training solution. This robust model comes in several versions which simulate many aspects of eye surgery including cataract surgery, anterior segment reconstruction, training for laser surgery and even posterior segment surgery such as vitrectomy and membrane peeling. SimulEye is based on the Simulorhexis model and shares many of the design aspects including the suction-cup base, flexible stalk to simulate ocular motility, and the ability to change the pressure in the vitreous gel.

SimulEye—Phaco:

Whole eye simulator with proper dimensions including the anterior chamber specially designed for phaco surgery; single use, closed system; realistic cornea to allow for incisions; simulated iris which supports the use of iris hooks or a Malyugin ring; anterior and posterior capsule with realistic, clear capsule material which can accommodate a capsule tension ring and capsule hooks; lens material of varying densities; vitreous-like gel posterior to lens which may present itself in the case of a posterior capsule tear; realistic red reflex for visualization during capsulorhexis; ability to increase pressure in the vitreous gel.

SimulEye—Vitrectomy:

Based on SimulEye—Phaco but without the lens to give better visualization of the posterior pole; single use, closed system; vitreous-like gel with variable opacity for improved visualization and understanding of vitrectomy techniques; opaque walls require that all visualization of intraocular contents and instruments must occur through the cornea; small footprint with ocular motility allows for realistic manipulation of the eye and instruments to aid in visualization and simulating surgical techniques; thin, clear membrane posteriorly to simulate an epiretinal membrane.

SimulEye—Femto:

Based on SimulEye—Phaco but ability to open eye to remove and replace lens for multiple uses; vitreous gel is not sticky and can easily be removed and replaced as it is simply to add volume and support behind the lens; lens material is a super-absorbent polymer which reacts similarly to the human lens when applying femtosecond laser pulses; anterior capsule paper is clear and simulates the human lens capsule and is able to be cut by the femto laser to produce a perfectly round capsulorhexis; small footprint with suction cup base and flexible stalk allows realistic practice of docking with the femto laser and then proceeding directly with the OCT measurements followed by the laser treatment without the need to switch to another model; cornea allows realistic viewing during docking and OCT viewing and will allow for placement of femto energy to simulate the creation of cornea incisions including the main cataract incision, side-port incisions, arcuate incisions and even a LASIK type flap.

SimulEye—Anterior Segment:

Based on SimulEye—Phaco; single use but each model allows for practice of multiple different techniques; simulated iris; lens capsule with realistic, clear, anterior and posterior capsules without any lens material and a pre-made capsulorhexis; allows for placement of IOL's in the bag as well as providing for the ability to practice sulcus placement or suture-fixated lenses; allows for practice with other anterior segment surgical devices such as capsule hooks, iris hooks, Malyugin rings, capsule tension rings, etc. and also allows practice of iris suturing techniques.

Simulorhexis and SimulEye are cost effective, easy to obtain, non-toxic and provide hands-on experience with unmatched realism to practice ocular surgical techniques prior to live surgery. The goal is to flatten the learning curve and reduce the anxiety that surgeons often face thereby reducing the complication rate and providing for better patient care.

Simulorhexis—Open Sky

Practice multiple CCC tears without the restrictions or difficulties of working though an incision. Viscoelastic agents can be placed on top for greater realism, Multiple small tears can be made in a single film before replacement or larger tears can be made to better visualize how the anterior capsule reacts when different force vectors are applied.

The colored or red film over CONTRASTING COLORED putty provides a high contrast for enhanced visualization. Practicing with this version does not require the use of a surgical microscope. The base can be fixed to any smooth surface using the suction cup. Rotation of the back half of the eye down onto the piston mechanism of the suction cup base will cause increased pressure on the PUTTY or putty-like material with resultant forward bowing of the film. This will simulate an increase in vitreous pressure and/or loss of viscoelastic from the anterior chamber which makes the CCC procedure more challenging as the tear tends to run outward and downhill.

Parts Listing includes: large colored (red) finishing ring; large double ring complex holding single colored (red film) (optional); gel or putty of contrasting color filling posterior half of eye; posterior half of eye; threaded piston mechanism; flexible stalk; and a suction cup.

Simulorhexis—Cornea Cap

After mastering the Open Sky version, replacing the large finishing ring with the Cornea Cap gives greater realism. This allows for creation of incisions to work through, provides an anterior chamber to fill with viscoelastic, and reduces the working area to a life-size scale. Parts Listing: same parts as for Open Sky embodiment, except a cornea cap ATTACHES TO the large finishing ring AND CAN BE REMOVED: a cornea cap; a LARGE COLORED (RED) FINISHING RING; a large double ring complex holding single colored (red) film (optional); a gel or putty of contrasting color filling posterior half of eye; posterior half of eye; threaded piston mechanism; flexible stalk; and suction cup.

SimulEYE—mimics eye anatomy to simulate a wide range of surgical procedures;

SimulEYE SimuloRhexis—removal of anterior lens capsule to practice CCC technique and includes: SimuloRhexis Open Sky version and SimuloRhexis Cortical cap version.

SimulEYE Phaco simulator;
SimulEYE Femto-LASER cataract simulator;
SimulEYE Vitrectomy simulator;
SimulEYE Anterior Segment Simulator;
SimulEYE Femto-LASER cornea refractive simulator;
SimulEYE YAG Caps Simulator;
SimulEYE SLT Simulator;
SimulEYE ARGON Simulator; and
SimulEYE™ Simulator.

SimulEYE YAG Caps Simulator

Actual IOL implant with realistic posterior capsule film; YAG LASER can create a realistic opening in the posterior capsule; used to train to focus LASER on film and not hit the IOL; no fluid needed in or around eye parts; no need to use capsulotomy lens; no goniosol gel required; logo placement on threaded stalk of suction cup base behind IOL for easy visibility; use with slit lamp stand to hold securely in place at YAG LASER; separate, darkly pigmented, flat surface area on stand with a finely threaded stalk for use in focusing or calibrating the LASER and the optics as well as understanding the physics behind the YAG LASER SimulEYE SLT Simulator In this embodiment, there is a pigment in angle of cornea cap with central cornea cut away; the SLT LASER creates color change to leave trail of spot placement; for use with a gonioscopy mirror to visualize the angle; learn how to rotate the lens and deliver LASER spots consecutively in the angle; no fluid needed in or around eye parts; central cornea cut away for direct visualization; no goniosol gel required; logo placement on threaded stalk of suction cup base behind IOL for easy visibility; and for use with slit lamp stand to hold securely in place at SLT LASER.

SimulEYE ARGON Simulator

This embodiment allows for use of film at back of eye accepts Argon LASER spots and shows color change; inverted realistic view of the retina; use with Argon LASER lenses; learn how to deliver Argon LASER spots to the retina while understanding proper orientation to only treat intended areas of the retina; use with slit lamp stand to hold securely in place at Argon LASER.

SimulEYE™ Simulator

This embodiment presents a realistic trabecular meshwork consisting of an appropriately sized canal representing the canal of Schlemm as well as an overlying, thin meshwork representing the trabecular meshwork; meshwork can be placed in the angle; central cornea cut away for direct visualization; no goniosol required; no fluid in or around eye parts; for use with trabecular procedures such as iStent placement; use with gonioprism lens to view the angle and the meshwork; work through a peripheral corneal incision for greater realism and challenge; and for use with Head Stand for positioning and realistic head and eye movement.

Stands for SimulEYE:

HEAD STAND for positioning and realistic head and eye movement.

SLIT LAMP STAND—for holding eyes to be viewed at a slit lamp and/or a LASER such as the YAG and SLT and ARGON LASERs.

Nd:YAG (neodymium-doped yttrium aluminum garnet; Nd:$Y_3Al_5O_{12}$) is a crystal that is used as a lasing medium for solid-state lasers.

SLT stands for: Selective Laser Trabeculoplasty.
SimuloRhexis Open Sky—flat working surface.
SimuloRhexis Open Sky—domed working surface with increased posterior pressure.
SimuloRhexis Cornea Cap—cornea cap in place, then shows large and small pupils.

SimuloEYE SLT—pigmented material in angle for use with SLT LASER.

SimuloEYE YAG Caps—IOL with posterior membrane for use with YAG LASER.

SimuloEYE SLT—gonio lens rests on SLT version; ability to view the angle.

HEAD STAND with SimulEYE mounted on top in various positions and with gonioprism.

SimuloEYE YAG Caps with Lumenis logo visible & magnified behind IOL/membrane.

SLIT LAMP STAND—multiple adjustments for use with all slit lamps and lasers having standard bar mounted chin rest for patient positioning; use with YAG, SLT & Argon LASERS.

Trabecular Meshwork Simulator—multilayered, realistic size canal representing canal of Schlemm, overlying material simulates trabecular meshwork, for use with trabecular procedures such as iStent implant device.

SimulEYE SimuloRhexis allows for presenting components separately; allows for use of "revolver" template (FIG. 7a) in place and on top of the film layer; then shows viscoelastic on top of one working area; then shows the "revolver" template removed and central pupil template (FIG. 7b) on top of the film layer and in place with cornea cap attached. The "revolver" template has at least one opening, six or multiple openings; the central pupil template has a central opening.

SimulEYE YAG Caps version shows "open sky" version for use in dry environment or in aqueous environment when the cornea cap is attached.

SimulEYE small pupil management presents a small pupil version with a Malyugin ring in place.

SimulEYE SLT Version is for "Open Sky" for dry environment; allows for use of a Cornea Cap for use in aqueous environment to give greater realism. When using the cornea cap and an aqueous environment, champagne-like bubbles are released at higher laser energy settings just like in the real eye.

SimulEYE is the family or core name for the whole line of surgical devices; SimuloRhexis is one device within the line that is specifically for CCC training; and referred to as SimulEYE SimuloRhexis or more simply just SimuloRhexis SimuloRhexis:

Open Sky version has a "revolver" pattern template (FIG. 7a) which allows for the creation and practice of six CCC's around the periphery of the model while preserving the central capsule for later use when the cornea cap is in place.

While working around the periphery of the "open sky" version with the template in place (FIG. 7a), the pressure is generally recommended to be kept low to maintain a flat working surface.

The "open sky" version of the SimuloRhexis device with the revolver template (FIG. 7a) in place is to be rotated each time to align the area of interest to be in-line with the surgeon's dominant hand.

Viscoelastic may be placed over each working area of the revolver template immediately prior to the creation or attempt at a CCC. The viscoelastic should be applied adequately to allow it to remain elevated over the working surface and act as the anterior chamber.

This improvement allows the option of not using a double ring. The cornea cap attaches to a single, notched, coupling ring which in turn holds the paper in place on the back half of the eye over the putty.

A single coupling ring is placed over the back half of the model eye. The ring holds the anterior capsule simulating film in place under tension over the putty which is simulating the lens. The ring is also used to provide several gates which act to visually restrict movements and simulate an incisional area. The ring is also used to alter the angle of attack when attempting a CCC as may be seen in a larger or myopic eye. The ring is also used to couple the cornea cap to the rest of the model. The ring is also used to help center the revolver template and the central pupil template.

The single ring can have three, 4 mm notches equally spaced around the periphery. These notches act as gates to practice working within as a way to simulate the restricted movements that occur when working through an incision. The adjacent ridges around the ring can be used to work over when attempting a CCC and will simulate a more difficult angle as may be encountered in a larger or myopic eye. The ring has an anterior lip which extends 360 degrees around the periphery except where the notches are located. This lip, in combination with the notches, allows for coupling of the cornea cap to the rest of the eye. A central pupil template is to be used in conjunction with the cornea cap. After completion of the peripheral 6 CCC's, the revolver template and viscoelastic are removed and the central pupil template and the cornea cap are installed. A final, central CCC through a corneal incision may be attempted with increased pressure as desired. When working with the cornea cap in place, the increase in pressure and resultant forward bowing of the film will not only cause the tear to want to radialize and run downhill, but the forward bowing will also cause the anterior chamber to shallow which will provide a realistic and more challenging working environment.

This invention has certain names including: SimulEYE SLT; SimulEYE Cataract/Phaco Simulator; and SimulEYE Argon/Posterior laser Simulator SimulEYE YAG Caps Simulator now has two options: Open Sky or Cornea Cap. The open sky option allows for practice without an aqueous environment as previously described. The Cornea Cap option allows for practice within an aqueous environment for added realism. The parts are required to be assembled in a water bath in order to get water on either side of the membrane which simulates the opacified posterior capsule. A logo can be place on the top surface of the suction cup base and will be revealed only upon opening of the capsule membrane with the YAG LASER. Neither version requires the use of a capsulotomy laser lens or goniosol.

The material used for the membrane may be Mylar or PTFE. The membrane material can be adequately stretched prior to assembly to simulate the proper tension as may be found in the posterior capsule. This will lend greater realism in terms of how the capsule opens upon delivery of the laser energy.

SimulEYE SLT

This is an original version with "open sky" and requires no water and no goniosol; alternate version with cornea cap allows for an aqueous environment for greater realism.

In either option, the laser creates a depigmentation to visualize where the treatment was placed. In the aqueous environment, at the time of the laser delivery, champagne-like bubbles are created just like in the real eye. By turning down the energy of the laser, the bubbles will diminish as the treatment effect diminishes just like in the real eye. This version does require use of the goniosol coupling agent in conjunction with the laser lens.

SimulEYE ARGON/Posterior LASER Simulator

May be used with an open sky cornea and a 3-mirror style laser lens; no fluid or water is required; no goniosol coupling agent is required; the film at the back is curved and adequately shows the problem encountered when applying multiple spot patterns whereby certain areas of the spots may be in focus while other areas may be out of focus due to the curvature of the eye and the angle of approach.

SimulEYE™ Simulator

The trabecular meshwork can be simulated through the use of a soft solid or gel-like material which simulates the surgical characteristics and feel during manipulation of the meshwork tissue such as when implanting the iStent device or performing other MIGS procedures.

SimulEYE Small Pupil Management

Small pupil within a stretchable material such as a very thin silicone membrane to allow realistic surgical manipulation of the iris such as when using iris hooks or when implanting various pupil expansion devices such as the Malyugin ring or when practicing maneuvers to manually stretch the pupil. The material sits above the anterior capsule simulating film and may be elevated with viscoelastic to allow space between the two surfaces.

Head Movement STAND:

There are dual outward and opposite facing suction cups; one cup applies suction to a flat, immobile surface such as a table or desk for stability; the other cup is attached to a small, flat platform for attaching the SimulEYE model. This dual suction cup platform allows for tilt and movement simulating head movement. The suction cup on the SimulEYE model attached to the platform will allow for simultaneous simulation of eye movement superimposed on the head movement.

An apparatus for practicing an ophthalmologic surgical technique of creating a continuous curvilinear capsulorhexis comprising:
a flexible film;
a malleable body, which comprises a gel, putty or clay material;
a housing with a first end and a second end;
 the first housing end has at least one sidewall and a bottom and holds the malleable body and exposes an operating portion of the malleable body;
 the second housing end is attachable to a surface;
 the second housing end is a suction cup;
a flexible stalk connects the first housing end to the second housing end with a threaded connector or another removable connection;
 the flexible film is wrapped substantially and tautly around the operating portion of the malleable body to create a relatively flat surgical practice surface;
 the malleable body is able to provide adequate resistance to a surgical tool and is able to mimic physical characteristics of a human lens,
 wherein the relatively flat surgical practice surface is a smooth surgical practice surface relatively similar to the physical feel and touch of a human anterior lens capsule, when the human anterior lens capsule becomes flattened with the introduction of a viscoelastic material into the anterior chamber prior to the creation of the capsulorhexis;
 a first cap engages the film to the first housing end; the first cap has a centrally disposed opening; the first cap has at least one flange; and
 the first housing end removably engages the first cap;
 whereby the first cap engages the first housing end, a pressure is exerted by the at least one flange on the malleable body to push the malleable body outside the first housing end and to change the surgical practice surface, which mimics wound distortion with loss of viscoelastic material or increased posterior vitreous pressure of the human eye during surgery; and
 whereby the smooth surgical practice surface substantially mimics human anterior lens capsule and lens structures for practicing the surgical technique of creating the continuous curvilinear capsulorhexis;
 the flexible film can comprises polyester, polypropylene, cellophane, mylar, paper or cellulose; a first cap engages the film to the first housing end; the first cap has a centrally disposed opening; a second cap engages the first housing end; the second cap has an inner portion and an outer portion; the first cap engages the first housing end with a friction connection or a removable connection.

The apparatus can further have a first template, which can fit within the first housing end, is placed on top of the flexible film; the template has a peripheral edge; the template has least one template opening near the peripheral edge; a second template, which can fit within the first housing end, is placed on top of the flexible film; and the template has least one template opening.

An apparatus for practicing an ophthalmologic surgical technique of creating a continuous curvilinear capsulorhexis comprising:
a flexible film;
a malleable body, which comprises a gel, putty or clay material;
a housing with a first end and a second end;
 the first housing end has at least one sidewall and a bottom and holds the malleable body and exposes an operating portion of the malleable body;
 the second housing end has a suction cup end;
a flexible stalk connects the first housing end to the second housing end with a threaded connector;
 the flexible film is wrapped around the operating portion of the malleable body to create a surgical practice surface;
 a first cap engages the film to the first housing end; the first cap has a centrally disposed opening.
 the malleable body is able to provide adequate resistance to a surgical tool and is able to mimic physical characteristics of a human lens,
 the first cap has at least one flange; and
 the first housing end removably engages the first cap;
 a first template, which can fit within the first housing end, is placed on top of the flexible film; the first template has a peripheral edge; and the first template has at least one first template opening near the peripheral edge;
 whereby the first cap engages the first housing end, a pressure is exerted by the at least one flange on the malleable body to push the malleable body outside the first housing end and to change the surgical practice surface, which mimics wound distortion with loss of viscoelastic material or increased posterior vitreous pressure of the human eye during surgery; and
 wherein the surgical practice surface is relatively similar to the physical feel and touch of a human anterior lens capsule, when the human anterior lens capsule becomes flattened with the introduction of a viscoelastic material into the anterior chamber prior to the creation of the capsulorhexis;
 whereby the smooth surgical practice surface substantially mimics human anterior lens capsule and lens structures for practicing the surgical technique of creating the continuous curvilinear capsulorhexis;
 a second template, which can fit within the first housing end, is placed on top of the flexible film; and the second template has at least one second template opening.

The apparatus can further have a flexible film, which comprises polyester, polypropylene, cellophane, mylar, paper and cellulose; a second cap engages the first housing end; the second cap has an inner portion and an outer portion; the first cap engages the first housing end with a friction connection.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Further, the title, headings, terms and phrases used herein are not intended to limit the subject matter or scope; but rather, to provide an understandable description of the invention. The invention is composed of several sub-parts that serve a portion of the total functionality of the invention independently and contribute to system level functionality when combined with other parts of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Any element in a claim that does not explicitly state "means for" performing a specific function, or "step for" performing a specific function, is not be interpreted as a "means" or "step" clause as specified in 35 U.S.C. Sec. 112, Paragraph 6. In particular, the use of "step of" in the claims herein is not intended to invoke the provisions of 35 U.S.C. Sec. 112, Paragraph 6.

Any listed or mentioned patents, applications or non-patent references are incorporated by reference in their entirety.

I claim:

1. An apparatus for practicing an ophthalmologic surgical technique of creating a continuous curvilinear capsulorhexis comprising:
a flexible film;
a malleable body, which comprises a gel, putty or clay material;
a housing with a first end and a second end;
the first housing end has at least one sidewall and a bottom and holds the malleable body and exposes an operating portion of the malleable body;
the second housing end is attachable to a surface;
the second housing end is a suction cup;
a flexible stalk connects the first housing end to the second housing end with a threaded connector;
the flexible film is wrapped substantially and tautly around the operating portion of the malleable body to create a relatively flat surgical practice surface;
the malleable body is able to provide adequate resistance to a surgical tool and is able to mimic physical characteristics of a human lens,
wherein the relatively flat surgical practice surface is a smooth surgical practice surface relatively similar to the physical feel and touch of a human anterior lens capsule, when the human anterior lens capsule becomes flattened with the introduction of a viscoelastic material into the anterior chamber prior to the creation of the capsulorhexis;
a first cap engages the film to the first housing end; the first cap has a centrally disposed opening; the first cap has at least one flange; and
the first housing end removably engages the first cap;
whereby the first cap engages the first housing end, a pressure is exerted by the at least one flange on the malleable body to push the malleable body outside the first housing end and to change the surgical practice surface, which mimics wound distortion with loss of viscoelastic material or increased posterior vitreous pressure of the human eye during surgery; and
whereby the smooth surgical practice surface substantially mimics human anterior lens capsule and lens structures for practicing the surgical technique of creating the continuous curvilinear capsulorhexis.

2. The apparatus of claim 1 wherein the flexible film comprises polyester, polypropylene, cellophane, mylar, paper or cellulose.

3. The apparatus of claim 1 wherein a first cap engages the film to the first housing end; the first cap has a centrally disposed opening.

4. The apparatus of claim 1 wherein a second cap engages the first housing end; the second cap has an inner portion and an outer portion.

5. The apparatus of claim 1 wherein a template, which can fit within the first housing end, is placed on top of the flexible film; the template has a peripheral edge; the template has least one template opening near the peripheral edge.

6. An apparatus for practicing an ophthalmologic surgical technique of creating a continuous curvilinear capsulorhexis comprising:
a flexible film;
a malleable body, which comprises a gel, putty or clay material;
a housing with a first end and a second end;
the first housing end has at least one sidewall and a bottom and holds the malleable body and exposes an operating portion of the malleable body;
the second housing end has a suction cup end;
a flexible stalk connects the first housing end to the second housing end with a threaded connector;
the flexible film is wrapped around the operating portion of the malleable body to create a surgical practice surface;
a first cap engages the film to the first housing end; the first cap has a centrally disposed opening;
the malleable body is able to provide adequate resistance to a surgical tool and is able to mimic physical characteristics of a human lens,
the first cap has at least one flange; and
the first housing end removably engages the first cap;
whereby the first cap engages the first housing end, a pressure is exerted by the at least one flange on the malleable body to push the malleable body outside the first housing end and to change the surgical practice surface, which mimics wound distortion with loss of viscoelastic material or increased posterior vitreous pressure of the human eye during surgery; and
wherein the surgical practice surface is relatively similar to the physical feel and touch of a human anterior lens capsule, when the human anterior lens capsule becomes flattened with the introduction of a viscoelastic material into the anterior chamber prior to the creation of the capsulorhexis;
whereby the smooth surgical practice surface substantially mimics human anterior lens capsule and lens structures for practicing the surgical technique of creating the continuous curvilinear capsulorhexis.

7. The apparatus of claim 6 wherein the flexible film comprises polyester, polypropylene, cellophane, mylar, paper and cellulose.

8. The apparatus of claim 6 wherein a second cap engages the first housing end; the second cap has an inner portion and an outer portion.

9. The apparatus of claim 6 wherein the first cap engages the first housing end with a friction connection.

10. The apparatus of claim 6 wherein a template, which can fit within the first housing end, is placed on top of the flexible film; the template has a peripheral edge; the template has least one template opening near the peripheral edge.

11. The apparatus of claim 6 wherein a template, which can fit within the first housing end, is placed on top of the flexible film; and the template has least one template opening.

12. An apparatus for practicing an ophthalmologic surgical technique of creating a continuous curvilinear capsulorhexis comprising:
- a flexible film;
- a malleable body, which comprises a gel, putty or clay material;
- a housing with a first end and a second end;
    - the first housing end has at least one sidewall and a bottom and holds the malleable body and exposes an operating portion of the malleable body;
    - the second housing end has a suction cup end;
- a flexible stalk connects the first housing end to the second housing end with a threaded connector;
    - the flexible film is wrapped around the operating portion of the malleable body to create a surgical practice surface;
    - a first cap engages the film to the first housing end; the first cap has a centrally disposed opening;
    - the malleable body is able to provide adequate resistance to a surgical tool and is able to mimic physical characteristics of a human lens,
    - the first cap has at least one flange; and
    - the first housing end removably engages the first cap;
- a first template, which can fit within the first housing end, is placed on top of the flexible film; the first template has a peripheral edge; and the first template has at least one first template opening near the peripheral edge;
- whereby the first cap engages the first housing end, a pressure is exerted by the at least one flange on the malleable body to push the malleable body outside the first housing end and to change the surgical practice surface, which mimics wound distortion with loss of viscoelastic material or increased posterior vitreous pressure of the human eye during surgery; and
- wherein the surgical practice surface is relatively similar to the physical feel and touch of a human anterior lens capsule, when the human anterior lens capsule becomes flattened with the introduction of a viscoelastic material into the anterior chamber prior to the creation of the capsulorhexis;
- whereby the smooth surgical practice surface substantially mimics human anterior lens capsule and lens structures for practicing the surgical technique of creating the continuous curvilinear capsulorhexis.

13. The apparatus of claim 12 wherein a second template, which can fit within the first housing end, is placed on top of the flexible film; and the second template has at least one second template opening.

* * * * *